United States Patent [19]

Lepere et al.

[11] Patent Number: 4,965,585

[45] Date of Patent: Oct. 23, 1990

[54] DEVICE FOR MOVING-CLUTTER ELIMINATION IN A RADAR

[75] Inventors: Guy Lepere, Le Mesnil Esnard; Jacques Kunegel, Paris; Jean-Pol Coulmier, Sevres, all of France

[73] Assignee: Thomson CSF, Paris, France

[21] Appl. No.: 321,420

[22] Filed: Mar. 8, 1989

[30] Foreign Application Priority Data

Mar. 18, 1988 [FR] France .................................. 88 03523

[51] Int. Cl.⁵ ...................... G01S 13/526; G01S 13/53
[52] U.S. Cl. .................... 342/160; 342/159; 342/162
[58] Field of Search ......................... 342/159, 160, 162

[56] References Cited

U.S. PATENT DOCUMENTS

| 4,035,799 | 7/1977 | Hsiao | 342/162 |
| 4,137,533 | 1/1979 | Briechle et al. | 342/162 |
| 4,375,640 | 3/1983 | Harvey | 342/93 |
| 4,488,154 | 12/1984 | Ward | 342/162 |
| 4,636,793 | 1/1987 | D'Addio et al. | 342/162 |
| 4,809,002 | 2/1989 | Togashi et al. | 342/160 |

Primary Examiner—Gilberto Barrón, Jr.
Attorney, Agent, or Firm—Cushman, Darby & Cushman

[57] ABSTRACT

The invention resides in the fact that the moving-clutter elimination filter is composed of several transversal filters whose $n+1$ multiplying coefficients $K0, K1, \ldots, K\alpha, \ldots, Kn$ are fixed and are derived from the coefficients $A0, A1, \ldots, A\alpha, \ldots, An$ of the fixed-clutter elimination filter by multiplying the latter by the factors:

$$F\alpha = e^{j2\pi Fd \times Tr(n-\alpha)}.$$

7 Claims, 5 Drawing Sheets

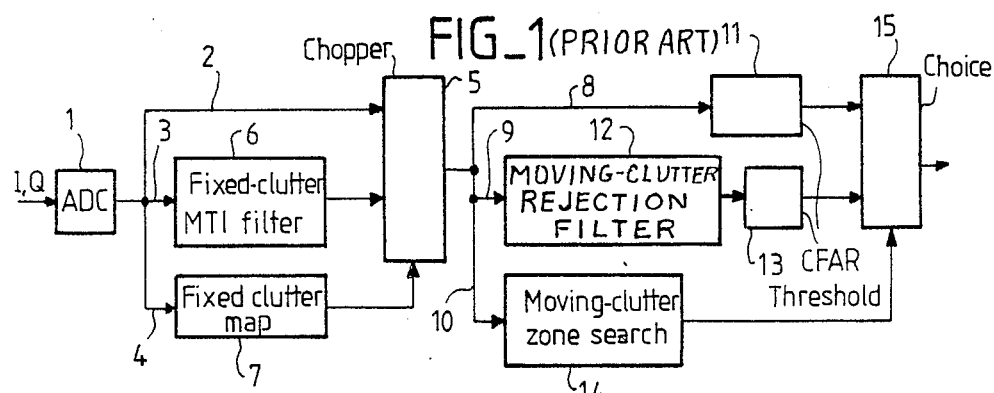
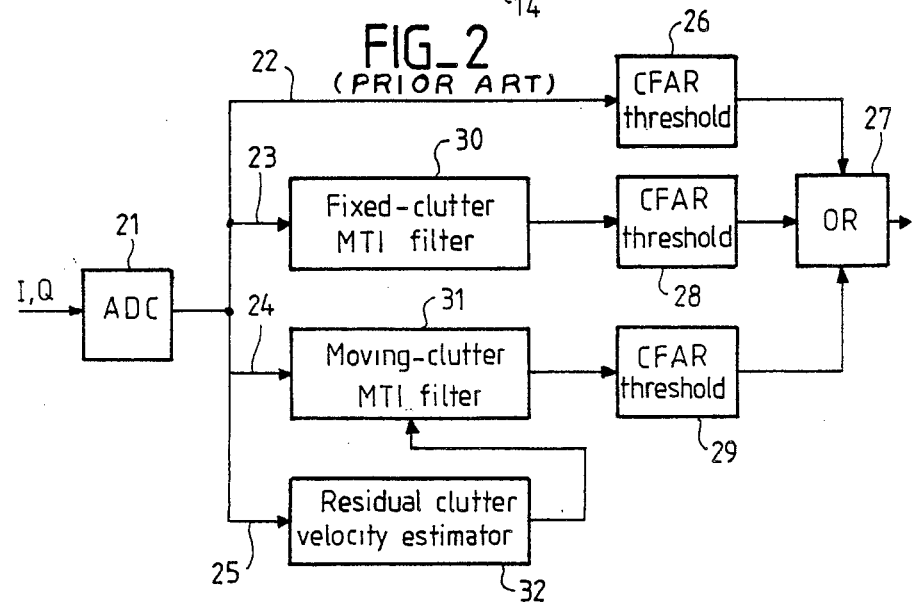
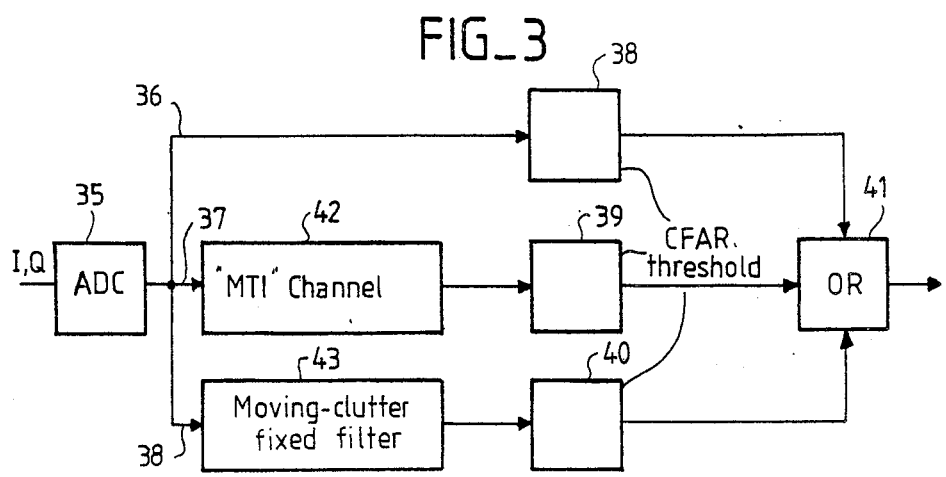

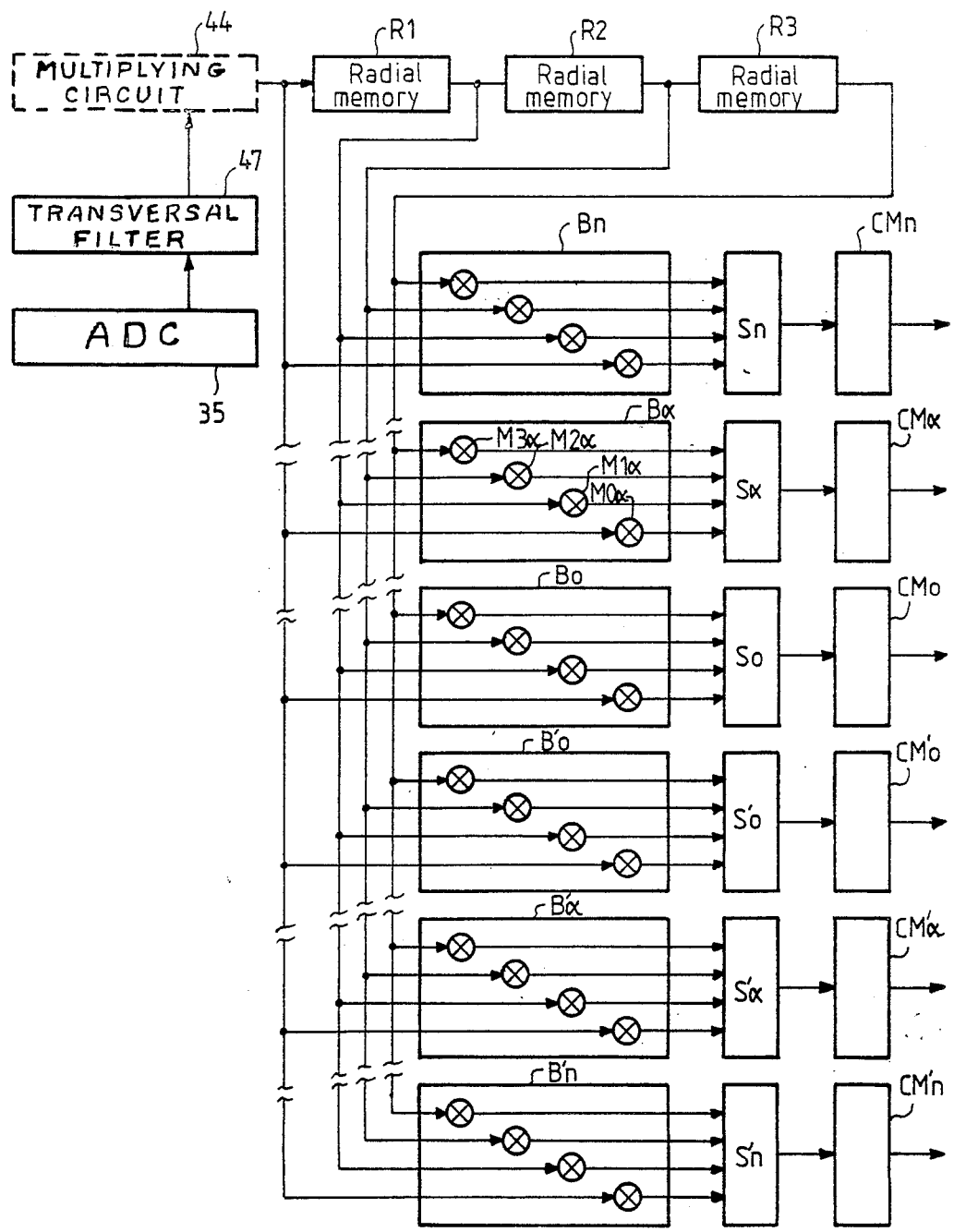
FIG_4

FIG_5
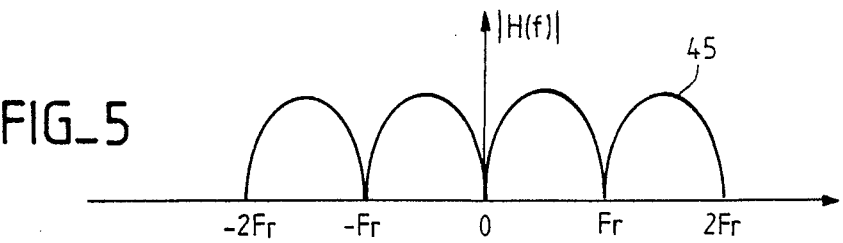
FIG_6
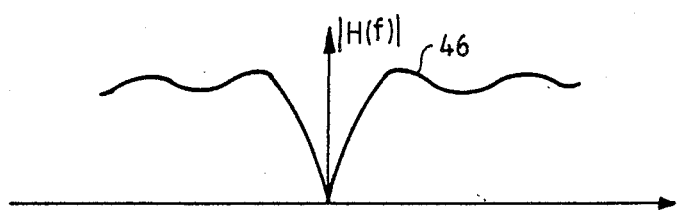
FIG_8
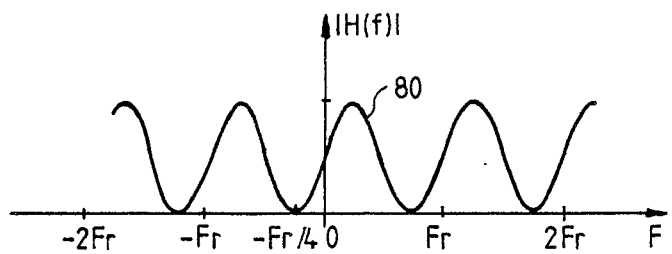
FIG_9
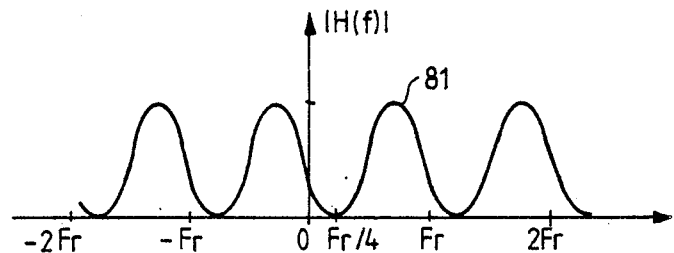

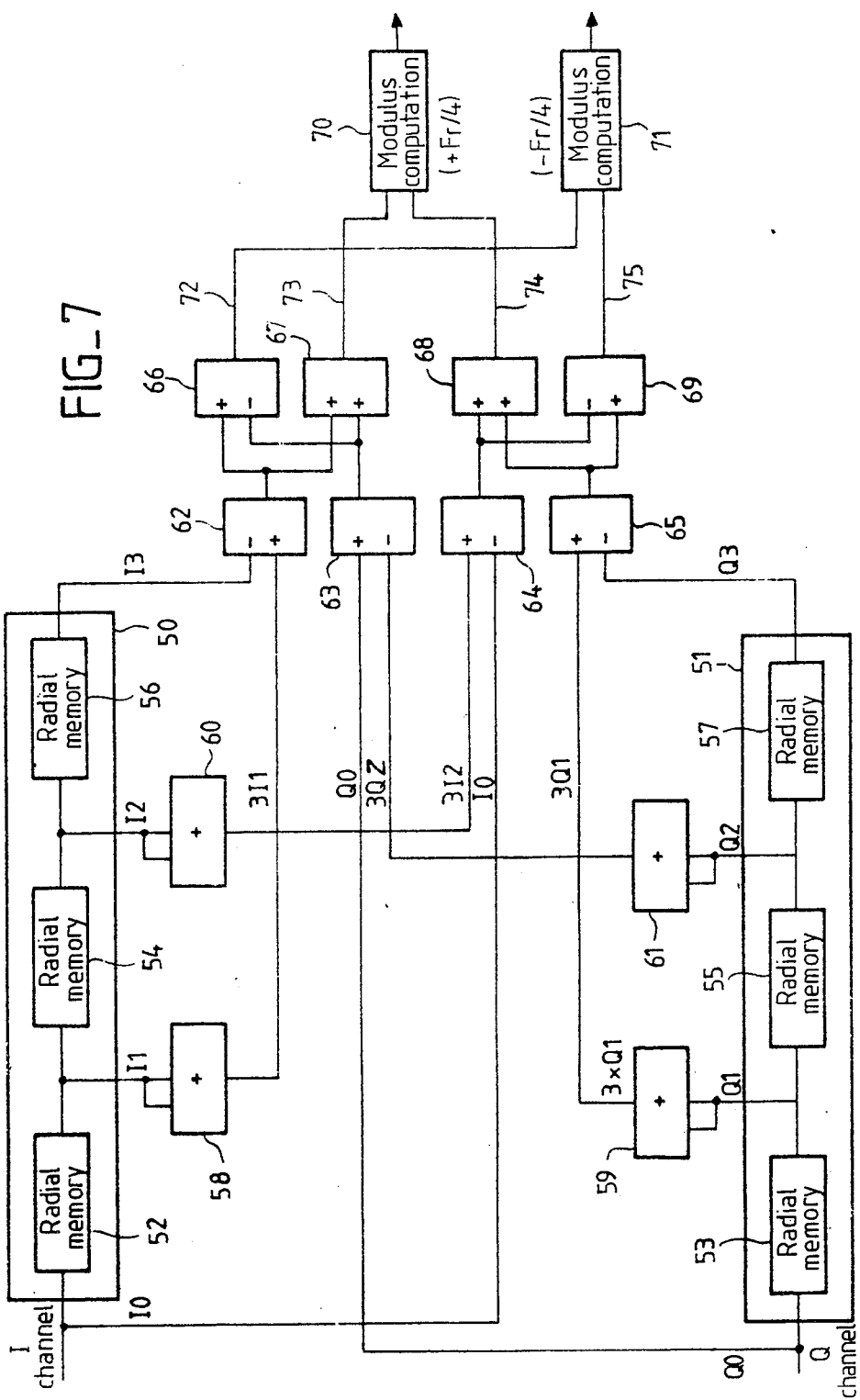

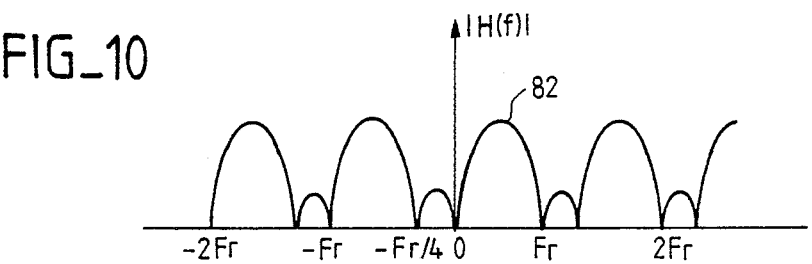
FIG_10
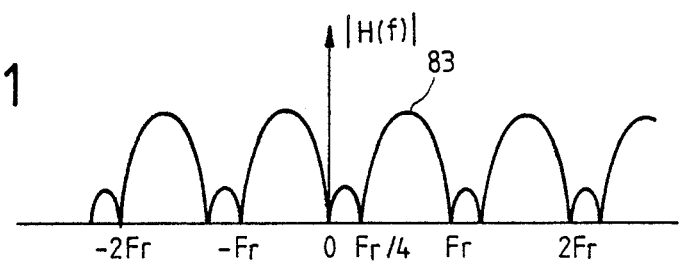
FIG_11
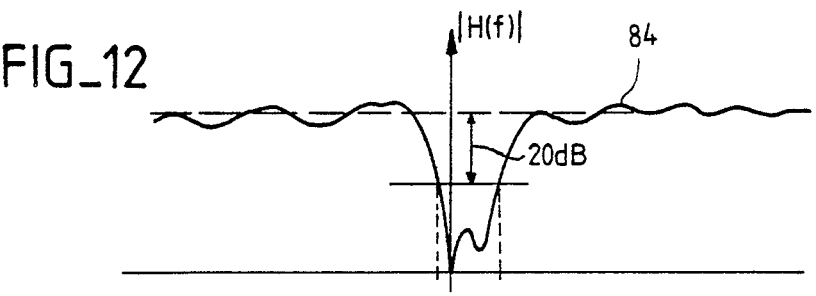
FIG_12
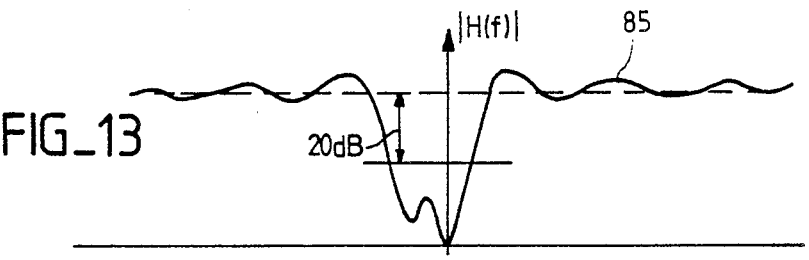
FIG_13

DEVICE FOR MOVING-CLUTTER ELIMINATION IN A RADAR

CROSS-REFERENCE TO RELATED APPLICATION

The subject matter disclosed hereinafter relates generally to the subject matter in copending application Ser. No. 07/325,586.

BACKGROUND OF THE INVENTION

1. Field of the Invention

The present invention relates to a device for eliminating in radar signals those corresponding to a radial velocity (also called "range rate") which is low in comparison with that of a large category of moving obstacles to be detected.

It is known to take advantage of the Doppler effect in radars to detect the moving obstacles that give rise to radar signals of low amplitude, amidst fixed obstacles corresponding to radar signals with high amplitude. Thus, in pulse radars of the coherent type and with a constant pulse repetition frequency Fr, the waves received after reflection on moving obstacles have a phase that changes from one pulse repetition period to the next, whereas the waves received from the fixed obstacles do not exhibit such phase shift changes. Due to this, the signals corresponding to moving obstacles have, after demodulation, complex components that vary sinusoidally with a frequency Fd called "Doppler shift" (or "Doppler frequency"), which is related to the radial velocity v and to the wavelength e of the radar by the formula $Fd = 2v/e$.

Furthermore, the signals corresponding to fixed obstacles have a constant amplitude, and their spectrum consists of a series of discrete lines at the frequencies 0, Fr, 2Fr, ..., nFr while the signals corresponding to moving obstacles is composed of discrete lines of the type $mFr \pm Fd$.

It will be appreciated that it is possible to eliminate the signals corresponding to the fixed obstacles by using a fixed-echo elimination filter that blocks the signals with the frequencies 0, Fr, 2Fr, ..., nFr.

It is also desirable to eliminate in certain radars such as the air traffic surveillance radars, the moving obstacles that have Doppler velocities which are low in comparison with the velocities of the moving obstacles of interest, for example clouds, or also the fluctuating fixed obstacles that have a certain Doppler velocity such as trees agitated by the wind. These various low-velocity spurious echoes are referred to as clutter.

2. Description of the Prior Art

Various systems have been proposed for eliminating the moving clutter at the same time as the fixed clutter. For example, one of them is based on the determination of the geographical situation of these clutters, and FIG. 1 shows an embodiment of such a system.

The radar signal S, with the real component I and imaginary component Q, is sampled in an analog-to-digital converter 1 and the amplitude of the samples is converted into a digital code before being applied to three parallel channels 2, 3 and 4 that lead to a first selecting device 5. Channel 2 corresponds to a direct link, i.e., without any signal processing and consequently without any loss of information. Channel 3 includes a fixed-echo elimination filter 6, that is a clutter-elimination filter, of conventional type, and channel 4 includes a device 7 that plots the map of the fixed clutter by determining, for example, the zone average level of the signal due to clutter. This map of the fixed clutter is used in the selecting device 5 to eliminate in the signals in channel 2 only those from the fixed-clutter zones marked by the circuit 7.

The output signals from the selecting device 5 are applied to three parallel channels 8, 9 and 10 that lead to a second selecting device 15. Channel 8 is a channel that includes only a threshold circuit 11 of the constant false alarm rate (CFAR) type. Channel 9 includes a moving-clutter rejection filter 12 followed by a CFAR threshold circuit 13, and channel 10 includes a circuit 14 for moving-clutter zone searching. When the presence of such zones is detected, the corresponding signal is used in the selecting device 15 to eliminate in the signals in channel 8 only those coming from the moving-clutter zones marked by the circuit 14.

The efficiency of the above-described system depends on the accuracy with which the fixed-clutter and moving-clutter zones are determined, i.e., on the number of these zones, which leads to use lots of hardware if it is desired to cover a maximum number of zones.

Another system for eliminating fixed and moving clutters is based on the measurement of the velocity and can be implemented as shown by the block diagram in FIG. 2. The radar signal S is applied to an analog-to-digital converter 21 similar to the converter 1 in FIG. 1, and the digital codes it delivers are applied to four parallel processing channels 22 to 25 whose first three channels 22, 23 and 24 lead to an OR circuit 27. The first channel 22 includes only a CFAR threshold circuit 26. The second channel 23 includes a fixed-echo elimination filter 30 followed by a CFAR threshold circuit 28, and the third channel 24 includes a moving-clutter elimination filter 31, also followed by a CFAR threshold circuit 29. The fourth channel 25 includes a moving-clutter velocity estimating circuit 32, this information being used to modify the transfer function of the filter 31 so as to match it to the detected velocity. With such a system with four channels in parallel, the signals from the OR circuit include neither those corresponding to the fixed echoes nor those corresponding to the moving clutter.

The performance of this system depends on the accuracy of the estimation of the mean velocity of the moving clutter, the size of the range window used by the moving-clutter mean velocity estimating circuit 32, and the variation of the instantaneous velocity of the moving clutter in this window. In addition, it may be necessary to use lots of hardware to implement such a system, which leads to high costs.

Furthermore, in both systems the use of a wobulation, i.e., of a known variation of the repetition frequency of the transmitted radar pulses restricts their performance, in particular for the estimation of the velocity of the moving clutter.

SUMMARY OF THE INVENTION

An object of the present invention is accordingly the implementation of a system for eliminating the moving clutter in a radar of the coherent type, that has not the above-mentioned disadvantages of the prior art systems, which is obtained without having to use circuits destined to determine the zones of moving clutter or the radial velocities of said moving clutter.

The present invention is first based on the observed fact that the velocity of the moving clutter corresponds, in air surveillance radar, to a Doppler shift that in general does not exceed Fr/2 in absolute value, knowing that a positive Doppler shift corresponds to a clutter approaching the radar, whereas a negative Doppler shift corresponds to a receding clutter.

The present invention is also based on the fact that it is possible to eliminate the signals corresponding to these Doppler shifts of the moving clutter by shifting the rejection zone of a fixed-echo elimination filter of the transversal type, which enables the use of a part of the elements of this transversal filter. This shift of the rejection zone is obtained by modifying only the weighting coefficients, and these modified coefficients have simple values and are therefore easy to use in the case where the rejection zones are shifted by $\pm Fr/4$.

The present invention relates to a device for eliminating the moving clutter with a Doppler shift Fd in a coherent pulse Doppler radar with a pulse repetition frequency Fr, in which the radar signals are applied simultaneously to two processing channels leading to an OR circuit, of which one includes a transversal filter for fixed-clutter elimination using $(n+1)$ multiplying coefficients $A0, \ldots, A\alpha, \ldots, An$ followed by a threshold circuit, whereas the other channel includes only a threshold circuit, wherein it includes in addition at least one third processing channel leading to said OR circuit, said third channel including a transversal filter followed by a threshold circuit, said transversal filter being composed of a bank of multiplying circuits whose multiplying coefficients are fixed and are derived from said coefficients $A0, \ldots, A, \ldots, An$ of said fixed-clutter elimination transversal filter by multiplying the latter coefficients by a factor:

$$F\alpha = e^{j2\pi Fd \times Tr(n-\alpha)}.$$

In the special case where the repetition frequency of the transmitted radar pulses is wobulated, the device according to the present invention must be preceded by a circuit compensating for this wobulation, which is mainly a multiplying circuit with a multiplying factor Wi and is used to phase-shift the radar signal. For values of the Doppler shift Fd equal in particular to $+Fr/4$ or $-Fr/4$, the multiplying coefficients $K\alpha$ or $K'\alpha$ are simple, and the same applies to the multiplying circuits.

BRIEF DESCRIPTION OF THE DRAWINGS

Other features and advantages of the present invention will become apparent from a consideration of the following detailed description of a particular embodiment given as a non-limitative example with reference to the accompanying drawings, in which:

FIG. 1 is a block diagram of a system for eliminating the fixed and moving clutters according to the prior art;

FIG. 2 is a block diagram of another system for eliminating the fixed and moving clutters according to the prior art;

FIG. 3 is a block diagram of a system for eliminating the fixed and moving clutters according to the present invention;

FIG. 4 is a block diagram of the processing channels 37 and 38 of the system in FIG. 3;

FIG. 5 is a diagram showing the trend of the transfer function of a transversal filter using only two coefficients;

FIG. 6 is a diagram showing the trend of the transfer function of a radar with wobulated pulse repetition frequency;

FIG. 7 is a schematic of an embodiment of two transversal filters for the frequencies $+Fr/4$ and $-Fr/4$; and FIGS. 8 through 13 are diagrams showing the trend of the transfer function of a transversal filter in various specific cases.

DESCRIPTION OF A PREFERRED EMBODIMENT

FIGS. 1 and 2 correspond to the prior art such as described in the preamble of this disclosure.

FIG. 3 is a block system of a system for eliminating the fixed and moving clutters according to the present invention, this system being similar to that described with reference to FIG. 2 but differing from it by the use of a moving-clutter elimination filter with fixed coefficients inserted in the third channel. This system includes an analog-to-digital converter 35 to whose input are applied the real I and imaginary Q components of the radar signals S. The output of the converter 35 is connected to three parallel processing channels 36, 37, 38 which lead to an OR circuit 41 through various elements that are different from one channel to another. Channel 36 includes only a threshold circuit of the constant false alarm rate (CFAR) type. Channels 37 includes a fixed-echo elimination filter 42 which is preferably of the transversal type, and a CFAR threshold circuit. Finally, channel 38 includes a moving-clutter elimination filter 43 which is, according to the present invention, of the transversal type, and a CFAR threshold circuit 40.

FIG. 4 is a block diagram of a particular embodiment of the fixed-clutter elimination filter 42 and of the moving-clutter elimination filter 43 (FIG. 3) according to the present invention, using a single structure of transversal filter. In this particular embodiment the structure comprises three delay sections, and the calculations are carried out simultaneously for four samples or codes corresponding to a certain distance from the radar. More precisely, the codes of the samples supplied by the analog-to-digital converter 35 are stored in a first memory R1 which has a capacity that allows it to store all the codes of the signals received during a pulse repetition period Tr of the radar. The codes read out of this memory R1, to be used in the memory that will be described hereinafter are written again into a memory R2 identical to R1. Similarly, the codes read out of the memory R2 are written again into a memory R3 identical to R1 and R2. The memories R1, R2 and R3 are read so as to use simultaneously three codes corresponding to a same range cell of which a fourth code, the most recent, is supplied to the input of the memory R1. The input of the memory R1 and the outputs of the memories R1, R2 and R3 are connected to banks of multiplying circuits B0, B1, $\ldots$, B$\alpha$, $\ldots$, Bn and B'0, B'1, $\ldots$, B'$\alpha$, $\ldots$, B'n, each followed by a summing circuit S0, S1, $\ldots$, S$\alpha$, $\ldots$, Sn and S'0, S'1, $\ldots$, S'$\alpha$, $\ldots$, S'n, respectively, and by a module computing circuit CM0, CM1, $\ldots$, CM$\alpha$, $\ldots$, CMn and CM'0, CM'1, $\ldots$, CM'$\alpha$, $\ldots$, CM'n, respectively. Each bank comprises four multiplying circuits M0$\alpha$, M1$\alpha$, M2$\alpha$, M3$\alpha$, for example for the bank B$\alpha$. For the sake of clarity, it will be assumed that the bank B0 associated with the summing circuit S0 corresponds to the fixed-clutter elimination filter on the side of the so-called positive frequencies, while the bank B'0 associated with the summing circuit S'0 corresponds to the fixed-clutter elimination filter on the side of the so-called negative frequencies. Similarly, each bank B corresponds to a positive frequency, while each bank B' corresponds to a negative frequency.

In the case of the fixed-clutter elimination filter, the values of the multiplying coefficients are known and will be called A0, A1, A2, A3 for the positive-frequency filter, and A'0 through A'3 for the negative-frequency filter. These values are A0=1, A1=−3, A3=−1, and A'0=−1, A'1=3, A'2=−3, A'3=1.

The multiplying coefficients $K_\alpha$ and $K'_\alpha$ used in the banks are derived from the coefficients A or A', respectively, by multiplying the latter by a factor that depends on the center frequency Fd of the filter and on the period Tr according to the formulas:

$$K\alpha = A\alpha e^{j2\pi Fd \times Tr(n-\alpha)}$$

and:

$$K'\alpha = A'\alpha e^{j2\pi Fd \times Tr(n-\alpha)}.$$

It can be shown that if only the modulus of the signals is of interest, using these coefficients permits the center frequency of the fixed-clutter elimination filter to be shifted by a value Fd or −Fd and thus to achieve the elimination of the moving clutter with a Doppler shift Fd or −Fd.

For this demonstration, use is made of the Z transform which is defined for example in the book entitled "Les filtres numériques" (Digital Filters) edited by R. Boite and H. Leich and published by Masson (France) in 1980—Chapter II.

The Z transform of a discrete-time signal $x_n$ is defined by the series:

$$\sum_{n=-\infty}^{+\infty} x_n z^{-n} \text{ denoted by } Z[(x_n)].$$

In the case of a radar signal, $x_n$ corresponds to the sequence of samples separated from one another by a pulse repetition period Tr.

The properties of the Z transform allow to demonstrate that the transfer function H(z) of the filter in FIG. 4 (without the multiplying circuit 44) can be written as:

$$H(z) = K0 + K1 \times z^{-1} K2 \times z^{-2} K3 \times z^{-3} \quad (2).$$

If we introduce the multiplying circuit 44, this function becomes:

$$Hi(z) = K0 \times C_{i+3} + K1 \times C_{i+2} \times z^{-1} + K2 \times C_{i+1} \times z^{-2} + K3 \times C_i z^{-3},$$

in which form $Ci = (e^{jr})_i = (e^{j2\pi Fd \times Tr})_i$.

The modulus of Hi(z) is then given by:

$$Hi(z) = K0 \times e^{j3r} + K1 \times e^{j2r} \times z^{-1} + K2 \times e^{jr} \times z^{-2} + K3 \times z^{-3},$$

which corresponds to a filter with a transfer function H(z) such that:

$$H(z) = K0 \times e^{j3r} + K1 \times e^{j2r} \times z^{-1} + K2 \times e^{jr} z^{-2} + K3 \times z^{-3} \quad (3)$$

The comparison of the formulas (2) and (3) shows that to achieve the frequency shift Fd of the modulus of the transfer function, it is sufficient to modify the coefficients of the multiplying circuits M0 through M3 so that they become:

$$K'0 = K0 \times e^{j3r}$$

$$K'1 = K1 \times e^{j2r}$$

$$K'2 = K2 \times e^{jr}$$

$$K'3 = K3.$$

In some radar signal processing systems, it is usual to perform a first elimination of the fixed clutter by using a transversal filter 47 (FIG. 4) including only a single radial memory. Such a filter has a transfer function which is represented by the curve 45 in FIG. 5, which leads to an insufficient elimination which is then improved by using a multiple-section transversal filter such as those corresponding to the summing circuits S0 and S'0 (FIG. 4).

Such filters eliminate not only the fixed clutter but also the moving targets whose Doppler shifts are integral multiples of the pulse repetition frequency Fr. To avoid these detection nulls, it is usual to vary the repetition frequency of the transmitted radar pulses, a method referred to as wobulation. The response curve is that denoted by 46 in FIG. 6. When such a method is used, the frequency shifts of the transversal filters described with reference to FIG. 4 cannot be achieved. Hence, it is proposed that the transversal filtering be preceded by a wobulation compensating step. This is obtained by multiplying the codes of the successive samples by coefficients Wi that change from a pulse repetition period to the next. These coefficients Wi are given by the formula:

$$Wi = e^{j2\pi Ti \times Fr}$$

where Ti is the duration of the period being considered; this multiplication corresponds to a shift of the radar signal. It should be noted that channel 36 of the block diagram in FIG. 3 does not include such a compensation, for it is not intended to reject the fixed clutter.

The present invention will be described hereinafter in special cases of application to air surveillance radar that have wavelengths of 10 centimeters (S band) and 23 cm (L band) and pulse repetition frequencies of 900 hertz and 340 Hz, respectively. In these special cases, it will be shown that the moving clutter is eliminated by using transversal filters shifted by +Fr/4 and −Fr/4. Now, such transversal filters can be implemented by using very simple coefficients $K\alpha$ and $K'\alpha$ that may be chosen among the four following sets for $K\alpha$:

(−j, 3, 3j, −1)

(1, 3j, −3, −j)

(j, −3, −3j, 1)

(−1, −3j, 3, j)

and among the four following sets for $K'\alpha$:

(j, 3, −3j, −1)

(1, −3j, −3, j)

(−j, −3, 3j, 1)

(−1, 3j, 3, −j).

FIG. 7 is a block diagram of an embodiment of the filter 43 in FIG. 3 in the special case of transversal filters with +Fr/4 and −Fr/4, which leads us to use the simple coefficients (−1, 3j, 3, j) for Kα and (−1, −3j, 3, j) for K'α.

The signal to be filtered is shown in the form of its real I and imaginary Q components that are first processed in two separated channels, then in a common portion. Each separated channel includes a memory 50 (or 51) that consists, in the case of a simultaneous processing of four samples, of three identical elementary memories 52, 54, 56 (or 53, 55, 57) that are provided to store in each of them, in the case of a radar signal, the codes of the samples corresponding to one pulse repetition period Tr. The output of the memories 52 and 54 (or 53 and 55) are connected respectively to adder circuits 58 and 60 (or 59 and 61) that carry out the operation of multiplication by the coefficient 3.

The common portion comprises adder circuits 62 through 69 and two modulus computing circuits 70 and 71. The adder circuits 62 through 65 and 66, 69 have a direct input (+), and a complementary input (−) that produces the complement of the code applied to it. More precisely, the (−) inputs of the adder circuits 62 through 65 are connected respectively:

to the output of the memory 56;
to the output of the adder circuit 61;
to the input of the memory 52; and
to the output of the memory 57.

Similarly, the (+) outputs of the adder circuits 62 through 65 are connected respectively:

to the output of the adder circuit 58;
to the input of the memory 53;
to the output of the adder circuit 60; and
to the output of the adder circuit 59.

Each output of the adder circuits 62 through 65 is connected to one of the two inputs of one of the adder circuits 66 through 69. Thus the output of the adder circuit 62 is connected to the (+) input of the adder circuits 66 and 67; the output of the adder circuit 63 is connected to the (−) input of the circuit 66 and to the (+) input of the circuit 67; the output of the circuit 64 is connected to the (+) input of the circuit 68 and to the (−) input of the circuit 61; finally, the output of the circuit 65 is connected to the (+) input of the circuits 68 and 69. The outputs 72 and 75 of the circuits 66 and 69 are connected to both inputs of the modulus computing circuit 71, while the outputs 73 and 74 are connected to both inputs of the modulus computing circuit 70.

If we denote respectively by I0, I1, I2 and I3 the codes of the samples at the input of the memory 52 and at the outputs of the memories 52, 54, 56, and by Q0, Q1, Q2, Q3 the codes of the samples at the input of the memory 51 and at the outputs of the memories 53, 55, 57, it can be seen that the following codes are obtained at the output of the circuits 66 through 69:

at the output 72 of the adder circuit 66:
$-I3+3I1-Q0+3Q2$;
at the output 75 of the adder circuit 69:
$-Q3+3Q1+I0-3I2$;
at the output 73 of the adder circuit 67:
$-I3+3I1+Q0-3Q2$;
at the output 74 of the adder circuit 68:
$-Q3+3Q1-I0+3I2$.

It has been shown above that to implement a filter so-called +Fr/4, it is necessary, according to the present invention, to multiply the complex samples X3, X2, X1 and X0 by the respective coefficients −1, 3j, 3, −j and carry out the sommation of the results of the multiplications, i.e., to obtain:

$$-1(I3+jQ3)+3j(I2+jQ2)+3(I1+jQ1)-j(I0+jQ0),$$

that is:

$$-I3+3I1+Q0-3Q2+j(-Q3+3Q1-I0+3I2),$$

which corresponds to the output 73 of the circuit 67 for the real part, and to the output 74 of the circuit 68 for the imaginary part.

With regard to the filter so-called −Fr/4, the respective coefficients that have been indicated above are −1, −3j, 3 and j for the complex samples X3, X2, X1, X0. At the output of the summing circuit S' in FIG. 4, we obtain:

$$-1(I3+jQ3)-3j(I2+jQ2)+3(I1+jQ1)+j(I0+jQ0),$$

that is:

$$-I3+3I1-Q0+3Q2+j(-Q3+3Q1+I0-3I2),$$

which corresponds to the output 72 of the circuit 66 for the real part, and to the output 75 of the circuit 69 for the imaginary part.

As a consequence of the foregoing, the modulus computing circuit 70 gives the modulus of the signal corresponding to the filter +Fr/4 while the circuit 71 gives the modulus of the signal corresponding to the filter −Fr/4. The description just given with reference to FIG. 7 shows that the application of the present invention to special cases of filters allows to obtain digital devices that are simple, easy to implement and use only elementary circuits.

The curve 80 of the diagram in FIG. 8 shows the trend of the modulus of the transfer function of the transversal filter +Fr/4 in the absence of wobulation. Similarly, the curve 81 of the diagram in FIG. 9 shows the trend of the modulus of the transfer function of the transversal filter −Fr/4 in the absence of wobulation. When these filters are preceded by a one-section fixed-echo elimination filter (circuit 47 in FIG. 4), the trend of the modulus of the transfer function is shown by the curve 82 of the diagram in FIG. 10 for the transversal filter +Fr/4, while the curve 83 of the diagram in FIG. 11 shows this trend for the transversal filter −Fr/4.

In the presence of wobulation, the curve 84 of the diagram in FIG. 12 shows the trend of the modulus of the transfer function of the transversal filter −Fr/4, while the curve 85 of the diagram in FIG. 13 shows the trend of the modulus of the transfer function of the transversal filter +Fr/4.

What is claimed is:

1. A device for eliminating the moving clutter with a Doppler shift Fd in a coherent pulse Doppler radar with pulse repetition frequency Fr comprising:
a first processing channel having a fixed-clutter elimination transversal filter using (n+1) first multiplication coefficients A0, A1, . . . , Aα, . . . , An followed by a threshold circuit;
a second processing channel having only a threshold circuit;
a third processing channel having a moving-clutter elimination transversal filter, said transversal filter comprising a bank of multiplying circuits having a set of fixed second multiplication coefficients K or K' which are derived from the first multiplication coefficients A0, A1, ..., Aα, ..., An of said fixed-clutter elimination transversal filter in said first processing channel by multiplying the first multiplication coefficients A0, A1, ..., Aα, ..., An by a factor Fα:

$$F\alpha = e^{j2\pi Fd \times Tr(n-\alpha)},$$

where Tr is a pulse repetition period, n is one less than the number of first multiplication coefficients A0, A1, ..., Aα, ..., An, and α is an order of a particular first multiplication coefficient A0, A1, ..., Aα, ..., An; and an OR circuit, coupled to receive said first, second, and third processing channel, having an output indicative of a processed signal.

2. A device for eliminating the moving clutter with a Doppler shift Fd in a coherent pulse Doppler radar with pulse repetition frequency Fr comprising:

a first processing channel having a fixed-clutter elimination transversal filter using (n+1) first multiplication coefficients A0, A1, ..., Aα, ..., An followed by a threshold circuit;

a second processing channel having only a threshold circuit;

a third processing channel having a moving-clutter elimination transversal filter, said transversal filter comprising a bank of multiplying circuits having a set of fixed second multiplication coefficients K or K' which are derived from the first multiplication coefficients A0, A1, ..., Aα, ..., An of said fixed-clutter elimination transversal filter in said first processing channel by multiplying the first multiplication coefficients A0, A1, ..., Aα, ..., An by a factor Fα:

$$F\alpha = e^{j2\pi Fd \times Tr(n-1)},$$

where Tr is a pulse repetition period, n is one less than the number of the first multiplication coefficients A0, A1, ..., Aα, ..., An, and α is an order of a particular first multiplication coefficient A0, A1, ..., Aα, ..., An; and an OR circuit, coupled to receive said first, second, and third processing channel, having an output indicative of a processed signal;

wherein said device is intended for filtering a complex signal I+jQ whose components are obtained in the form of successive digital codes separated by time intervals equalling the pulse repetition period Tr, said moving-clutter elimination transversal filter using, at a frequency +Fr/4, four second multiplication coefficients K0, K1, K2, K3 that may respectively have the values of one of the four following sets:

(−j, 3, 3j, −1)

(1, 3j, −3, −j)

(j, −3, −3j, 1)

(−1, −3j, 3, j)

and, at a frequency −Fr/4, four second multiplication coefficients K'0, K'1, K'2, K'3 that may respectively have the values of one of the four following sets:

(j, 3, −3j, −1)

(1, 3j, −3, j)

(−j, −3, −3j, 1)

(−1, 3j, 3, −j)

wherein said moving-clutter elimination transversal filter comprises:

a fourth processing channel for processing the successive codes of the real component I;

a fifth processing channel for processing the successive codes of the imaginary component Q;

wherein each said first and second channel include three memories to store all the successive codes appearing during the pulse repetition period Tr, thereby enabling a simultaneous reading of codes I0 or Q0, I1 or Q1 or Q1, I2 or Q2, I3 or Q3 corresponding to the same signal to be filtered;

a plurality of adder circuits, connected to be supplied with the radar signals I0 through I3 and Q0 through Q3 delivered respectively by the first and second processing channels, for computing, by use of the modulus of one of said sets of coefficients, the real and imaginary parts of a filtered signal corresponding to the shift +Fr/4, and of a filtered signal corresponding to the shift −Fr/4; and a plurality of circuits for computing the modulus of said filtered signals.

3. A device according to claim 2, wherein said plurality of adder circuits are provided for computing the following sums:

−I3+3I−Q0+3Q2, that corresponds to the real part of the filter output signal shifted by +Fr/4;

−Q3+3Q1+I0−3I2, that corresponds to the imaginary part of the filter output signal shifted by +Fr/4;

−I3+3I1+Q0−3Q2, that corresponds to the real part of the output filter signal shifted by −Fr/4; and −Q3+3Q1−I0+3I2 that corresponds to the imaginary part of the filter output signal shifted by −Fr/4.

4. A device for eliminating the moving clutter with a Doppler shift Fd in a coherent pulse Doppler radar with pulse repetition frequency Fr comprising:

a first processing channel having a fixed-clutter elimination transversal filter using (n+1) first multiplication coefficients A0, A1, ..., Aα, ..., An followed by a threshold circuit;

a second processing channel having only a threshold circuit;

a third processing channel having a moving-clutter elimination transversal filter, said transversal filter comprising a bank of multiplying circuits having a set of fixed second multiplication coefficients K or K' which are derived from the first multiplication coefficients A0, A1, ..., Aα, ..., An of said fixed-clutter elimination transversal filter in said first processing channel by multiplying the first multiplication coefficients A0, A1, ..., Aα, ..., An by a factor Fα:

$$F\alpha = e^{j2\pi Fd \times Tr(n-\alpha)},$$

where Tr is a pulse repetition period, n is one less than the number of the first multiplication coefficients A0, A1, ..., Aα, ..., An, and α is an order of a particular first multiplication coefficient A0, A1, ..., Aα, ..., An; and an OR circuit, coupled to receive said first, second, and third processing channel, having an output indicative of a processed signal;

wherein said pulse repetition frequency Fr of transmitted radar pulses is wobulated;

wherein at least said moving-clutter elimination transversal filter in said third channel is preceded by a wobulation compensating device that includes a multiplying circuit which multiplies the radar signal by a coefficient Wi such that:

$$Wi = e^{j2\pi Ti \times Fr}$$

where Ti is a pulse repetition period when the repetition frequency of the transmitted radar pulses is wobulated.

5. A device for eliminating the moving clutter with a Doppler shift Fd in a coherent pulse Doppler radar with pulse repetition frequency Fr comprising:

a first processing channel having a fixed-clutter elimination transversal filter using (n+1) first multiplication coefficients A0, A1, ..., Aα, ..., An followed by a threshold circuit;

a second processing channel having only a threshold circuit;

a third processing channel having a moving-clutter elimination transversal filter, said transversal filter comprising a bank of multiplying circuits having a set of fixed second multiplication coefficients K or K' which are derived from the first multiplication coefficients A0, A1, ..., Aα, ..., An of said fixed-clutter elimination transversal filter in said first processing channel by multiplying the first multiplication coefficients A0, A1, ..., Aα, ..., An by a factor Fα:

$$F\alpha = e^{j2\pi Fd \times Tr(n-\alpha)},$$

where Tr is a pulse repetition period, n is one less than the number of the first multiplication coefficients A0, A1, ..., Aα, ..., An, and α is an order of a particular first multiplication coefficient A0, A1, ..., Aα, ..., An; and an OR circuit, coupled to receive said first, second, and third processing channel, having an output indicative of a processed signal;

wherein said processing channels are preceded by a fixed-clutter elimination transversal filter.

6. A device for eliminating the moving clutter with a Doppler shift Fd in a coherent pulse Doppler radar with pulse repetition frequency Fr comprising:

a first processing channel having a fixed-clutter elimination transversal filter using (n+1) first multiplication coefficients A0, A1, ..., Aα, ..., An followed by a threshold circuit;

a second processing channel having only a threshold circuit;

a third processing channel having a moving-clutter elimination transversal filter, said transversal filter comprising a bank of multiplying circuits having a set of fixed second multiplication coefficients K or K' which are derived from the first multiplication coefficients A0, A1, ..., Aα, ..., An of said fixed-clutter elimination transversal filter in said first processing channel by multiplying the first multiplication coefficients A0, A1, ..., Aα, ..., An by a factor Fα:

$$F\alpha = e^{j2\pi Fd \times Tr(n-\alpha)},$$

where Tr is a pulse repetition period, n is one less than the number of the first multiplication coefficients A0, A1, ..., Aα, ..., An, and α is an order of a particular first multiplication coefficient A0, A1, ..., Aα, ..., An; and an OR circuit, coupled to receive said first, second, and third processing channel, having an output indicative of a processed signal;

wherein said moving-clutter elimination transversal filter is at a frequency $+Fr/4$ and uses four second multiplication coefficients K0, K1, K2, K3 that may respectively have the values of one of the four following sets:

$(-j, 3, 3j, -1)$ $(1, 3j, -3, -j)$ $(j, -3, -3j, 1)$ $(-1, -3j, 3, j).$

7. A device for eliminating the moving clutter with a Doppler shift Fd in a coherent pulse Doppler radar with pulse repetition frequency Fr comprising:

a first processing channel having a fixed-clutter elimination transversal filter using (n+1) first multiplication coefficients A0, A1, ..., Aα, ..., An followed by a threshold circuit;

a second processing channel having only a threshold circuit;

a third processing channel having a moving-clutter elimination transversal filter, said transversal filter comprising a bank of multiplying circuits having a set of fixed second multiplication coefficients K or K' which are derived from the first multiplication coefficients A0, A1, ..., Aα, ..., An of said fixed-clutter elimination transversal filter in said first processing channel by multiplying the first multiplication coefficients A0, A1, ..., Aα, ..., An by a factor Fα:

$$F\alpha = e^{j2\pi Fd \times Tr(n-\alpha)},$$

where Tr is a pulse repetition period, n is one less than the number of the first multiplication coefficients A0, A1, ..., Aα, ..., An, and α is an order of a particular first multiplication coefficient A0, A1, ..., Aα, ..., An; and an OR circuit, coupled to receive said first, second, and third processing channel, having an output indicative of a processed signal;

wherein said moving-clutter elimination transversal filter is at a frequency $-Fr/4$ and uses four second multiplication coefficients K0, K1, K2, K3 that may respectively have the values of one of the four following sets:

$(j, 3, -3j, -1)$ $(1, 3j, -3, j)$ $(-j, -3, -3j, 1)$ $(-1, 3j, 3, -j).$

* * * * *